United States Patent [19]
Mathis

[11] Patent Number: 5,847,384
[45] Date of Patent: Dec. 8, 1998

[54] METHOD FOR DETERMINING IRREGULARITIES IN A WELLBORE WALL USING A GAMMA-GAMMA WELL LOGGING INSTRUMENT

[75] Inventor: Gary L. Mathis, St. Augustine, Tex.

[73] Assignee: Western Atlas International, Inc., Houston, Tex.

[21] Appl. No.: 827,792

[22] Filed: Apr. 11, 1997

[51] Int. Cl.$^6$ .................................................. G01V 5/12
[52] U.S. Cl. ...................................... 250/269.3; 250/266
[58] Field of Search ............................ 250/269.3, 269.7, 250/269.8, 266

[56] References Cited

U.S. PATENT DOCUMENTS

| | | | |
|---|---|---|---|
| 5,390,115 | 2/1995 | Case et al. | 250/269.3 |
| 5,659,169 | 8/1997 | Michael et al. | 250/269.3 |

*Primary Examiner*—Edward P. Westin
*Assistant Examiner*—Richard Hanig
*Attorney, Agent, or Firm*—Richard A. Fagin

[57] ABSTRACT

A method for determining a profile of a wall of a wellbore drilled through earth formations. The earth formations are irradiated by a source of gamma rays. Scattered gamma rays are detected at axially spaced apart locations from the source. At least one of the axially spaced apart locations is positioned on an opposite side of the source from the other ones of the spaced apart locations. A function, related to a rate of detecting the scattered gamma rays at a first one of the spaced apart locations with respect the rate of detecting scattered gamma rays at the at least one spaced apart location positioned on the opposite side of the source is calculated. Density of the earth formations, density of the fluid in the wellbore, and a difference between the densities is determined. An area bounded by the function is determined. The area is scaled with respect to the difference between the densities, and the profile is calculated from the scaled area bounded by the function.

12 Claims, 18 Drawing Sheets

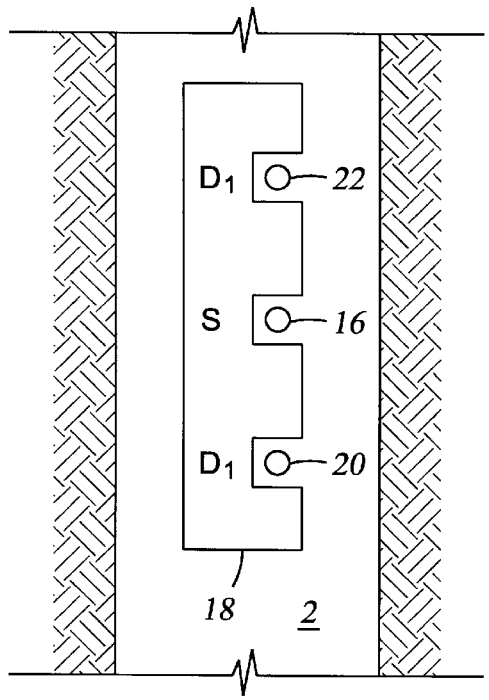
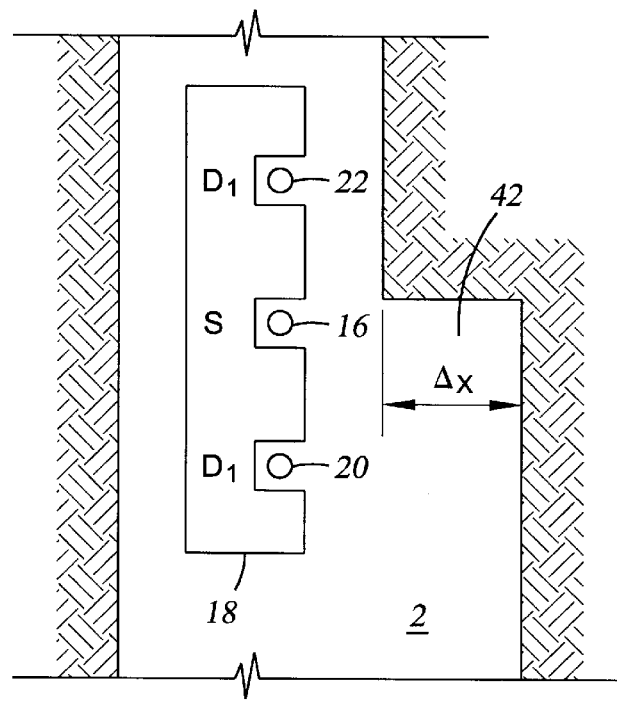
*Fig. 2A*  *Fig. 2B*
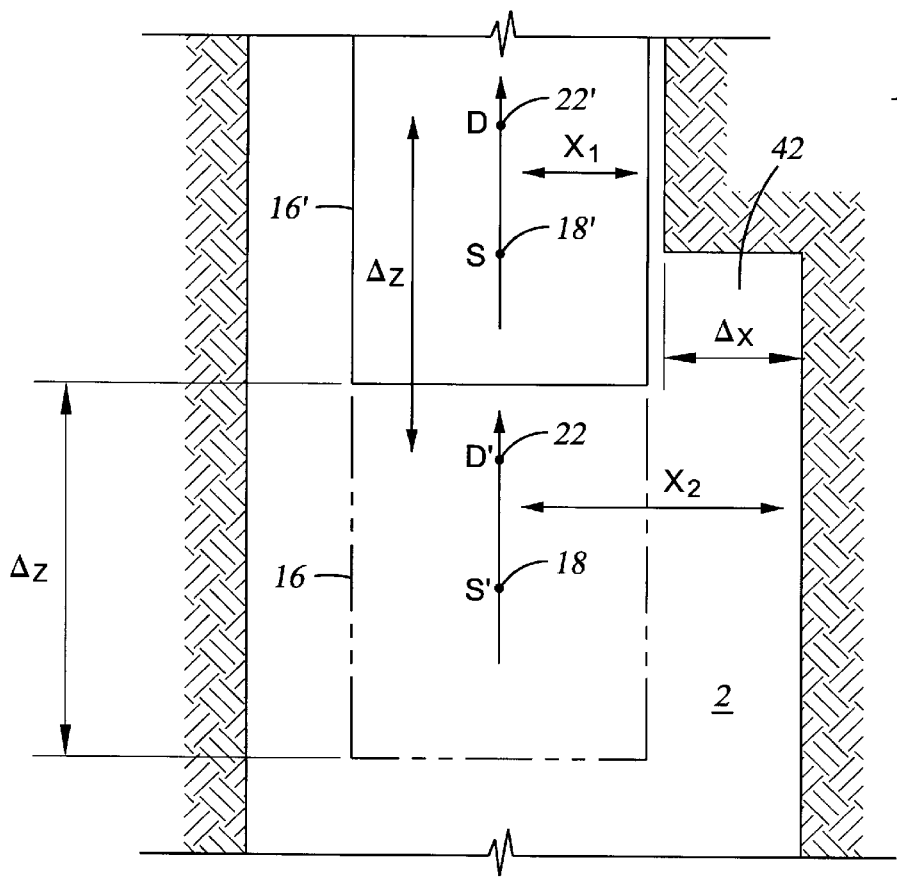
*Fig. 7*

METHOD FOR DETERMINING IRREGULARITIES IN A WELLBORE WALL USING A GAMMA-GAMMA WELL LOGGING INSTRUMENT

BACKGROUND OF THE INVENTION

1. Field of the Invention

The invention is related to the field of well logging apparatus and methods for determine the density of earth formations. More specifically, the invention is related to methods for determining the magnitude of irregularities in the wall of a wellbore drilled through the earth formations, by interpreting measurements made of scattered gamma rays.

2. Description of the Related Art

Well logging instruments used for determining the bulk density of earth formations are generally similar to an instrument disclosed in U. S. Pat. No. 3,321,625 issued to Wahl. The instrument in the Wahl '625 patent includes a source of gamma rays having a predetermined energy magnitude. The source is typically a steady-state, isotopic chemical source such as cesium-137. The tool includes two gamma-ray photon detectors positioned at axially spaced apart locations from the source. The source and detectors are typically disposed in a high-density (typically metallic tungsten) "shield" or "skid" mounted on one side of the instrument. The shield restricts the gamma ray output of the source to be principally in the direction of the earth formation, and restricts the entry of gamma rays into the photon detectors to be primarily from the direction of the earth formation. The shield is typically placed into firm contact with the wall of the wellbore by means of a powered, extensible arm directed from the opposite side of the instrument on which the shield is located.

Gamma rays emanating from the source into the formations can interact with electrons orbiting individual atoms of the materials forming the earth formations. Each interaction can cause a gamma ray to lose some of its energy and be deflected from its original direction of travel. The source is typically selected so that the original energy magnitude of the gamma rays facilitates this type of interaction, known as Compton scattering. The rate at which the scattered gamma rays lose energy and are deflected from their original directions is related to both the electron density of the earth formation (the number of electrons per unit volume of the formation) and the distance between the source and the detector. Some gamma rays can survive the Compton scattering process and return to the detectors where they are counted. The counting rate at any one of the detectors resulting from Compton-scattered gamma rays can be described by the relationship:

$$I = I_o e^{-\mu x} \quad (1)$$

where I represents the counting rate at a particular detector having an axial spacing X from the source, $I_o$ represents the counting rate at zero axial spacing from the source, and $\mu$ represents an "absorption" coefficient, which is related to the electron density of the earth formation in contact with the shield and axially interposed between the source and the particular detector. For most materials from which earth formations are typically composed, the electron density is directly related to the bulk density, so the measurements of detector counting rates can be directly scaled into measurements of bulk density of the formation by using the relationship in equation (1). Compensation of the density measurements for imperfect contact between the shield and the wall of the wellbore is well described in the Wahl '625 patent.

A drawback to the bulk density instruments known in the art which are derived from the Wahl '625 patent is that they generally require that the wall of the wellbore be reasonably smooth in order to make accurate measurements, because the previously described empirical relationship is devised with the simplifying condition that a mud cake which may be interposed between the wellbore wall (and therefore the earth formation) and the shield has substantially equal thickness at both of the detectors and at the source. In particular, if the wellbore wall is not smooth, the measurements made by the bulk density instruments known in the art are subject to error. The error results from the fact that the source, or either of the detectors may be exposed to a different thickness of mud cake to the wellbore wall. As is known in the art, a rough wellbore wall is quite common, making the bulk density instruments known in the art particularly susceptible to this cause of error in their measurements.

An improvement to the instrument described in the Wahl '625 patent can be found in U.S. Pat. No. 5,530,243 issue to Mathis, which describes a density well logging instrument having an "array" of spaced apart gamma ray photon detectors. The instrument in the Mathis '243 patent also includes a near-spaced detector position in a direction opposite to the source from a near-spaced detector forming part of the array of detectors. By combining measurements from the two opposing near-spaced detectors, it is possible to obtain in indication of tool "tilt", or degree of misalignment between the instrument shield and the wall of the wellbore.

It has been determined that the measurements provided by opposing gamma ray photon detectors arranged as described in the Mathis '243 patent can also be used to provide a quantitative estimate of the degree of roughness, called a "profile", of the wellbore wall.

SUMMARY OF THE INVENTION

The invention is a method for determining the profile of a wall of a wellbore drilled through earth formations. The earth formations are irradiated by a source of gamma rays. Scattered gamma rays are detected at axially spaced apart locations from the source. At least one of the axially spaced apart locations is positioned on an opposite side of the source from the other ones of the spaced apart locations. A function, related to a rate of detecting the scattered gamma rays at a first one of the spaced apart locations, with respect to the rate of detecting scattered gamma rays at the at least one spaced apart location positioned on the opposite side of the source is calculated. Density of the earth formations, density of the fluid in the wellbore, and a difference between the densities is determined. An area bounded by the function is determined. The area is scaled with respect to the difference between the densities, and the profile is calculated from the scaled area bounded by the function.

In an alternative embodiment of the invention, the value of the function can be determined from measurements of scattered gamma rays initially detected at one spaced apart location from the source of the gamma rays, combined with measurements of scattered gamma rays subsequently detected at the same one spaced apart location from the source after the source has moved a predetermined distance along the wellbore.

BRIEF DESCRIPTION OF THE DRAWINGS

FIG. 2A shows the two most closely spaced detectors in the instrument of FIG. 1 as placed in contact with a smooth wellbore wall.

FIG. 2B shows the detectors of FIG. 2A placed in contact with a wellbore wall having a step-like discontinuity.

FIG. 7 shows how delayed measurements from one detector can be combined with measurements made later by the same detector to determine the wellbore profile.

DESCRIPTION OF THE PREFERRED EMBODIMENT

Figure 1:
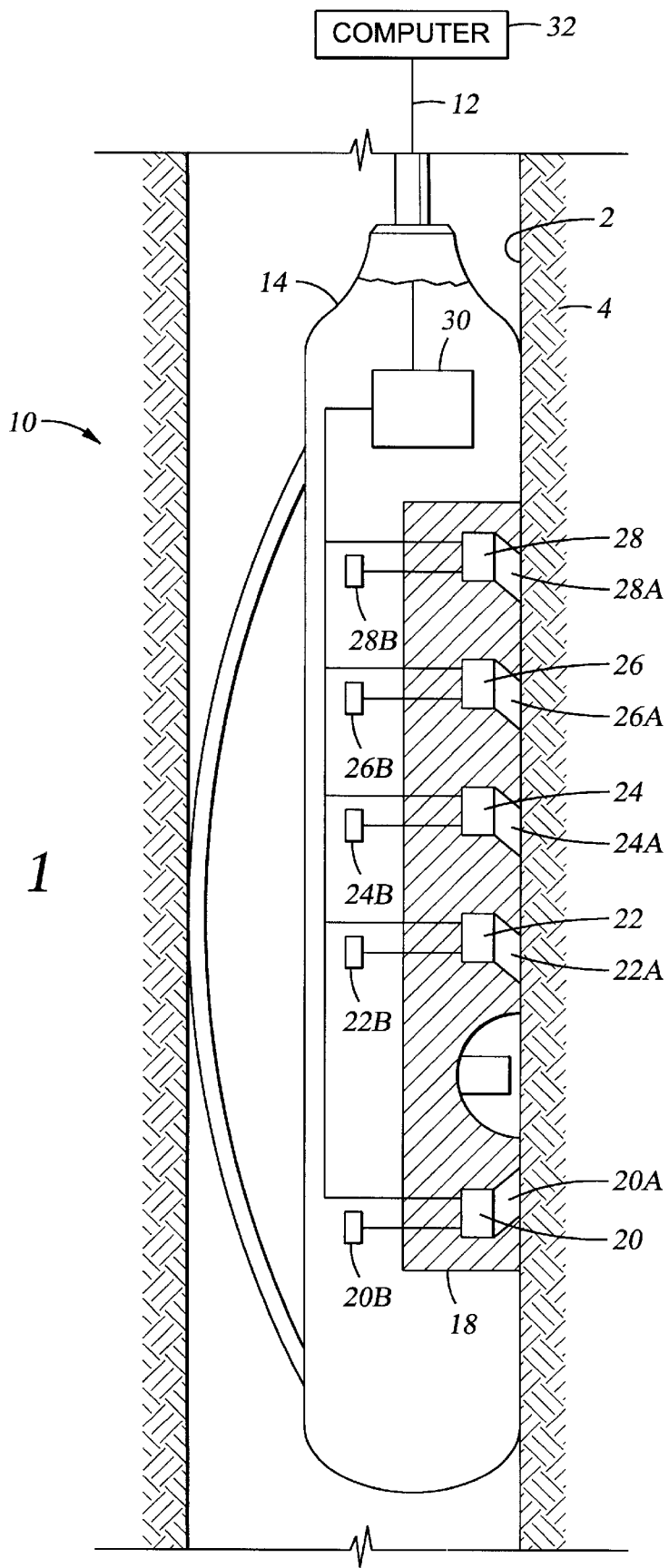
FIG. 1 shows a density well logging instrument suitable for making measurements used in the method of this invention.

U.S. Pat. No. 5,530,243 issued to Mathis describes a density well logging instrument which is particularly suitable for use with the invention, although it is to be understood that this instrument is not the only one which can be used for the method of this invention. The well logging instrument is shown generally in FIG. 1 at 10. The instrument 10 includes an elongated tool housing, or sonde 14, adapted to traverse a wellbore 2 drilled through earth formations 4. The sonde 14 can be attached to one end of an armored electrical cable 12. The cable 12 can be used to lower the sonde 14 into and retract it from the wellbore 2, to conduct electrical power to the tool 10 and to carry signals transmitted by the tool 10 to the earth's surface for interpretation and recording, as is understood by those skilled in the art.

An axially elongated shield 18, typically composed of a very dense material such as tungsten, is disposed in the sonde 14. The shield 18 is preferably radially displaced to one side of the sonde 14 to enable it to come into contact with the wall of the wellbore 2. The shield 18 can include a number of windows, such as those shown at 20A, 22A, 24A, 26A and 28A, through which gamma rays can pass relatively unimpeded. As is understood by those skilled in the art, the windows can be formed so as to open towards likely directions of origin of gamma rays which are coherently (Compton) scattered by the earth formation 4. The side of the shield 18 on which the open ends of the windows 20A, 22A, 24A, 26A, 28A are located typically is positioned in the wellbore 2 proximal to the wellbore 2 wall. As is understood by those skilled in the art, gravity tends to urge the shield 18 into contact with the wall of the wellbore 2 because the shield 18 is radially offset inside the sonde 14. The sonde 14 can optionally be provided with a bowspring 13 or other well known eccentralizing device disposed on the sonde 14 circumferentially opposite to the shield 18. The bowspring 13 (or other eccentralizing device) is used to urge the shield 18 into contact with the wall of the wellbore 2 when gravity does not provide sufficient force, such as can be the case in substantially vertical wellbores.

Disposed inside the shield 18 at the inner end of each window is a gamma ray detector, such as a null detector 20, a first detector 22, a second detector 24, a third detector 26 and a fourth detector 28. The detectors can be geiger-mueller type radiation counters or, preferably, scintillation counters. Each detector can include a corresponding high-voltage power supply such as shown at 20B, 22B, 24B, 26B and 28B, of types well known in the art. The signal output of each one of the detectors can be electrically connected to a telemetry unit 30. The telemetry unit 30 applies electrical signals to the cable 12 which correspond to the numbers of counts registered by each detector in response to detected gamma rays.

As is understood by those skilled in the art, other circuitry (not shown) associated with the transmission of detection counts from scintillation counter gamma ray detectors can include a multichannel pulse-height analyzer (not shown) for characterizing the apparent energy level of each gamma ray detected by each one of the detectors. As is also understood by those skilled in the art, the telemetry unit 30 can send signals to the earth's surface which correspond to the apparent energy level of each of the gamma rays counted by each detector, so that properties of the earth formation 4 such as the "photoelectric effect" may be determined. Using scintillation counters as detectors or using pulse-height analyzers, however, is a matter of convenience for the system designer and is not to be construed as a limitation on the invention. This invention will also function properly when the instrument 10 includes the previously mentioned geiger-mueller counters.

A source of high energy gamma rays 16 can be disposed in the shield 18 in a window such as the one shown at 16A. The source 16 preferably can be a radioisotope such as cesium-137, which emits gamma rays having substantially uniform energy of about 667 thousand electron volts (keV). The energy of the gamma rays emitted from the cesium-137 source, as is understood by those skilled in the art, is well suited to produce coherent scattering (so-called "Compton" scattering) of the gamma rays emitted from the source 16 by interaction with electrons orbiting atoms in the earth formations 4.

Window 16A is formed to allow gamma rays from the source 16 to enter the earth formation 4 proximal to the open end of the window 16A, but substantially excludes passage of gamma rays in any other direction, particularly directly along the shield 18 towards the detectors. The shield 18 therefore substantially excludes entry of gamma rays into the detectors from any other direction but from the windows in the shield 18.

Gamma rays leave the source 16 and enter the formation 4. Some of the gamma rays can be Compton scattered by electrons orbiting atoms of the earth formation 4, and return to one of the detectors. If there is substantially perfect contact between the shield 18 and the earth formation 4, and if the earth formation 4 is substantially homogeneous, the counting rate which would be observed at each one of the detectors would generally be related to the electron density of the earth formation 4 in contact with the shield 18 and the distance between the source 16 and the particular detector.

The number of detectors and their spacings is a matter of convenience for the system designer and is not intended to limit the scope of this invention. The important aspect of this invention is the use of the null detector 20 positioned at an axial spacing from the source 16 substantially equal to the axial spacing from the source 16 of the first detector 22. The null detector 20 is on the side of the source 16 axially opposite to location of the first detector 22. Since the null detector 20 and the first detector 22 have substantially equal spacings to the source 16, they respond to substantially equal radial "depths" of investigation into the earth formation 4, or any other media disposed proximal to the shield 18 at the axial positions of the null 20 and first 22 detectors. If the shield 18 is in substantially coaxial contact with a smooth wall in the wellbore 4, then the gamma ray count rates at the null detector 20 and at the first detector 22 should be substantially equal. In this embodiment of the invention, the spacing between the source 16 and the null detector 20, and between the source 16 and the first detector 22 can be about five inches, and is typically selected to make the null detector 20 and the first detector 22 primarily responsive to the density of a drilling fluid (referred to as "drilling mud") and any deposited solids (referred to as "mud cake") precipitated from the drilling fluid which may be present on the wall of the wellbore 2.

As is understood by those skilled in the art, the wellbore 2 typically includes portions in which the wall of the wellbore 2 is not smooth. If the wall of the wellbore 2 is not smooth, the shield 18 will not make perfect contact with the wall of the wellbore 2 over the entire length of the shield 18, and consequently, not at the axial locations of the first detector 22 and the null detector 20. Each one of the detectors 20, 22 may therefore respond to gamma rays which at least partially scatter through different thicknesses of the drilling mud (not shown) typically filling the wellbore 2 and thereby located in "pockets" in the rough wall of the wellbore 2.

The invention provides a method for determining the approximate radial depth of these "pockets" by analyzing the counting rates from the null 20 and first 22 detectors. The analysis of the counting rates can be better understood by referring to FIGS. 2A and 2B. In FIG. 2A, the shield 18 is shown traversing a substantially smooth wall in the wellbore 2. The distances between the wall and the source 16, the null 22, and the first 22 detectors are substantially the same. One of the "pockets" can be approximately represented by a step-like discontinuity, shown in FIG. 2B at 42. The radial depth of the discontinuity 42 can be represented by $\Delta x$. As shown in FIG. 2B, the first detector 22 is still in contact with the wall of the wellbore 2, but the null detector 20 is separated from the wall by the depth of the discontinuity $\Delta x$.

At any axial position of the instrument (10 in FIG. 1) within the wellbore 2, a function $\zeta$ can be defined with respect to the counting rate responses of the null 20 and first 22 detectors:

$$\zeta(\rho_F - \rho_M, z) = \ln \left[ \frac{R_0(\rho_F, \rho_m, z)}{R_1(\rho_F, \rho_M, z)} \right] \qquad (2)$$

where $R_0$ and $R_1$ represent, respectively, functions related to the counting rates of the null 20 and first 22 detectors. Because the counting rates of the detectors are related to the formation density $\rho_F$, the drilling mud density $\rho_M$ and the axial position of the detectors z, the functions $R_0$ and $R_1$, as indicated in equation (2), are also related to the formation density $\rho_F$, the drilling mud density $\rho_M$ and the axial position of the detectors z. The value of the function $\zeta$ is related to the difference in densities between the density of the drilling mud and the density of the formation, because the value of the function $\zeta$ must be equal to zero when the mud and formation densities are equal, irrespective of the value of the radial depth $\Delta x$ of the discontinuity 42. The counting rate responses of the detectors 20, 22 which would obtain across a step-like discontinuity such as the one shown at 42 in FIG. 2B can be estimated by two-dimensional gamma ray diffusion modeling methods described in the appendix to this description of the invention. It is to be clearly understood that the expression in equation (2) for the function $\zeta$ is not an exclusive representation of the relationships between the counting rates at the detectors which will generate values of the function $\zeta$ which can be used in the invention. The logarithmic expression in equation (2) was selected to make calculation of the function $\zeta$ easier, specifically because the logarithm of counting rates of scattered gamma rays is generally linearly related to the density of the medium through which the gamma rays are scattered, as can be inferred from equation (1). As will be further explained, using the expression in equation (2) to calculate the value of $\zeta$ provides a directly proportional relationship between a particular property of the function $\zeta$ and the radial depth $\Delta x$ of the discontinuity 42.

Figure 3:
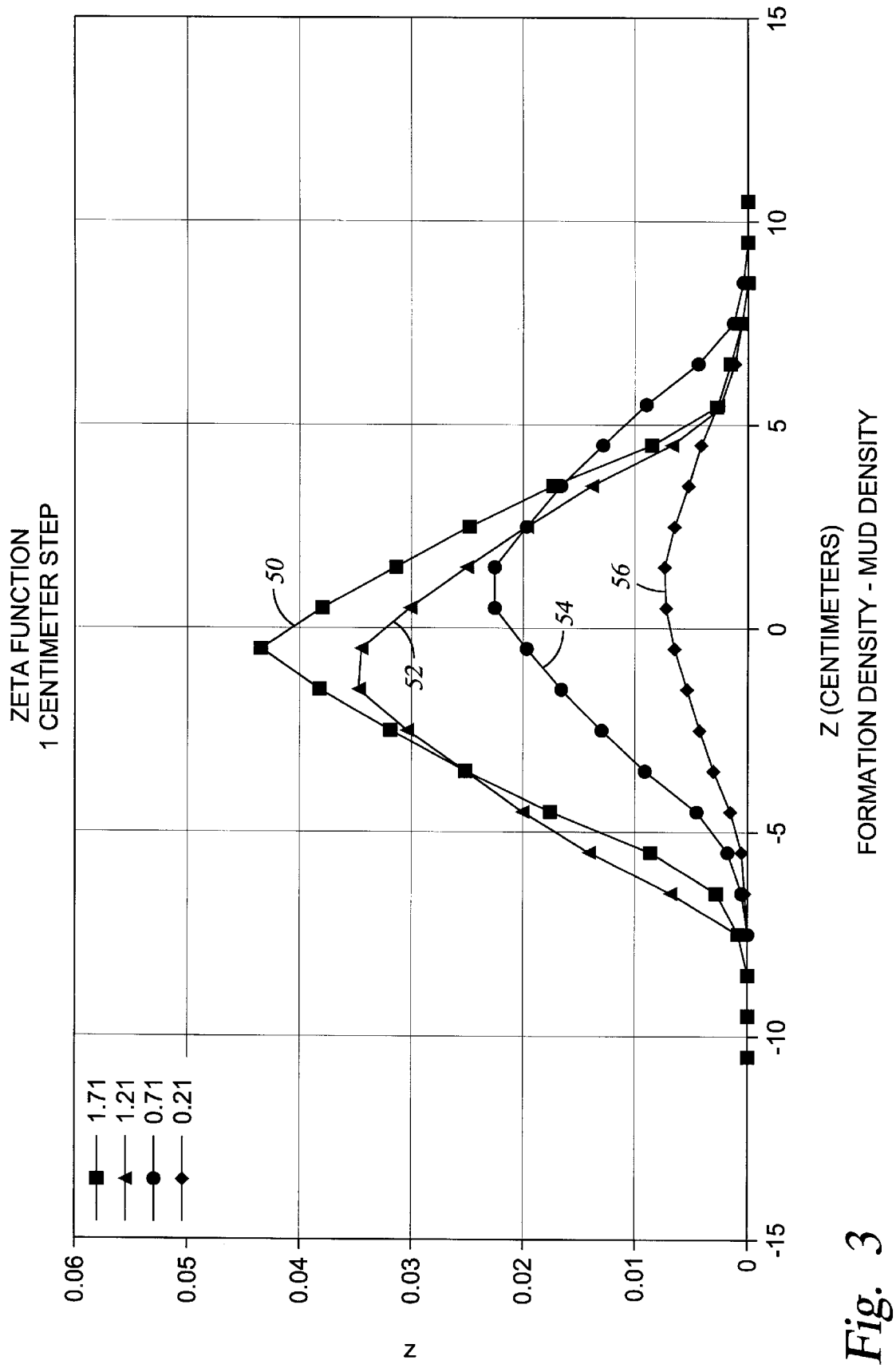
FIG. 3 shows a graph of a the value of a "zeta" ($\zeta$) function with respect to the axial position of the detectors of FIG. 2B.

The modeled response of the detectors 20, 22 to a step-like discontinuity and the associated value of the function $\zeta$ are shown in FIG. 3. The coordinate axis of the graph in FIG. 3 represents the axial position of the source (16 in FIG. 1) with respect to the position of the discontinuity (42 in FIG. 2B). At zero on the coordinate axis the source 16 is positioned at the location of the discontinuity 42. The radial depth of the discontinuity $\Delta x$ for all the results shown in FIG. 3 is one centimeter. The value of the function $\zeta$ with respect to the axial position is shown for various values of density difference between the formation $\rho_F$ and the mud $\rho_M$. The values of density difference are 1.71 grams per cubic centimeter (g/cc) at curve 50, 1.21 g/cc at curve 52, 0.71 g/cc at curve 54, and 0.21 g/cc at curve 56. Reduced peak magnitude of the function $\zeta$ with decreasing density difference is consistent with the expected response of the detectors (20, 22 in FIG. 1) to discontinuities.

The area under each of the curves 50, 52, 54, 56, each curve representing the value of the function $\zeta$ for each value of radial depth of the discontinuity $\Delta x$, can be calculated by the expression:

$$A(\rho_F - \rho_M, \Delta x) = \int_{-\infty}^{\infty} \zeta_{\Delta x}(\rho_F - \rho_M, z) dz \qquad (3)$$

Figure 4:
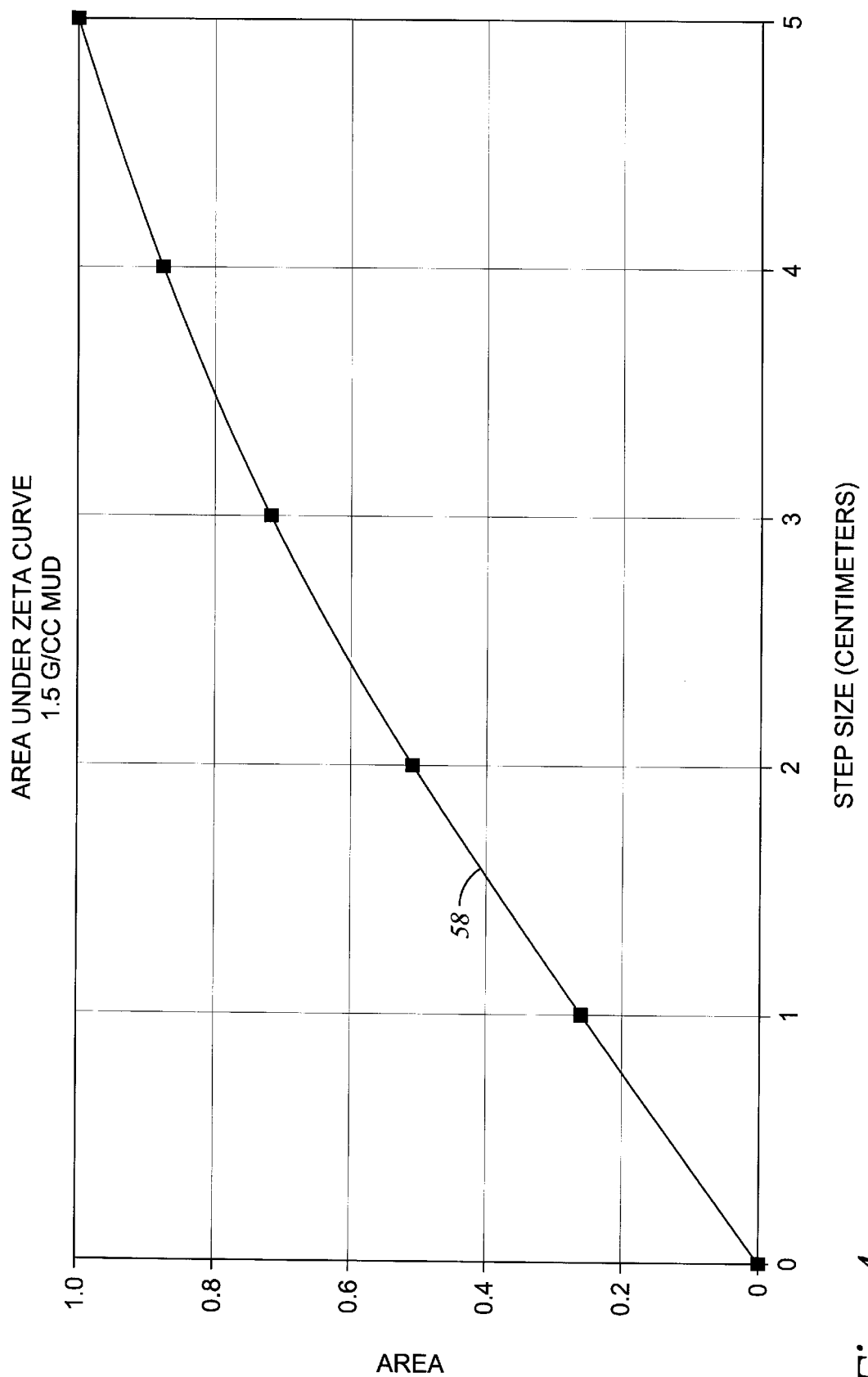
FIG. 4 shows a graph of the area bounded by the function $\zeta$ with respect to difference in density between the formation and the drilling mud.

It has been determined through diffusion modeling that for any single value of the difference between the formation density and mud density ($\rho_F - \rho_M$), the area under the curve as calculated according to equation (3) is directly proportional to the radial depth of the discontinuity $\Delta x$. This result is shown in FIG. 4 at curve 58, which represents the value of the area under the curve of the function $\zeta$ for a fixed value of density difference of 1.21 gm/cc and for radial depths of the discontinuity $\Delta x$ of 1, 2, 3, 4 and 5 cm. The relationship between the area under the curve representing the function $\zeta$, and the radial depth of the discontinuity $\Delta x$, is substantially linear up to about 4 cm radial depth. The result is that the area under any particular curve representing the function $\zeta$ is directly related both to the difference between formation and mud densities, and the radial depth of discontinuities in the wall of the wellbore.

It is thus possible to define a weighting factor w by which to scale the area under the curve traced by the function $\zeta$ to adjust the area for the actual value of the difference in density between the formation and the mud. This can be expressed by the relationship:

$$w(\rho_F - \rho_M) = A(\rho_F - \rho_M, \Delta x = 1 \text{cm}) \qquad (4)$$

Figure 5:
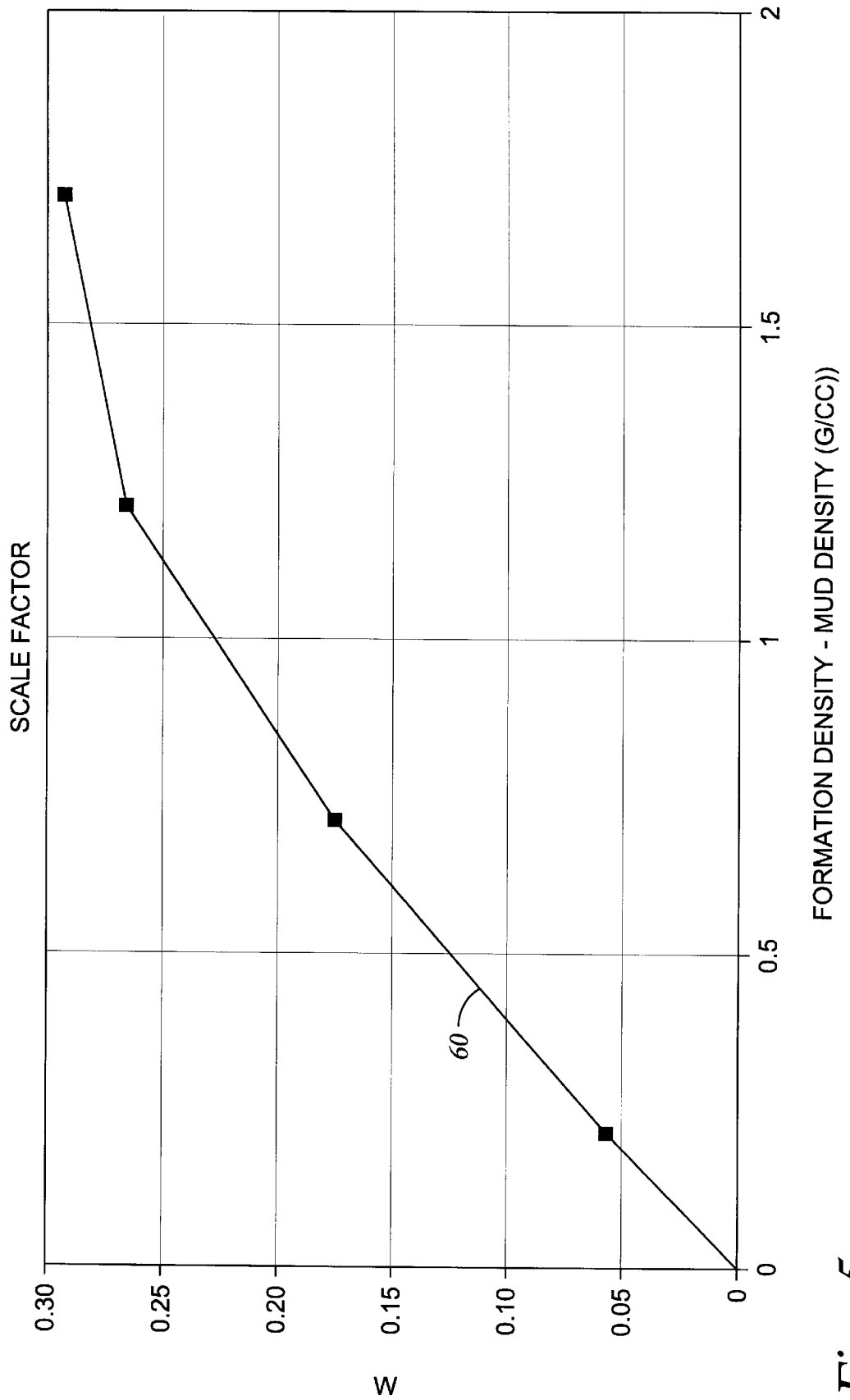
FIG. 5 shows, for a constant value of density difference, the area bounded by the function $\zeta$ with respect to the radial depth of the discontinuity shown in FIG. 2B.

By scaling the area for the actual difference in density between the formation and the mud, the area under the curve of function ζ will then be directly related only to the radial depth of the discontinuity. The relationship defined in equation (4) is shown graphically in FIG. 5 at curve 60. The graph in FIG. 5 represents the value of the weighting factor w with respect to the difference between the formation and mud densities, for a radial depth Δx of the discontinuity of 1 cm.

The density of the formation can be determined from the counting rates of the other detectors (24, 26, 28 in FIG. 1) using for example, the method described in U. S. Pat. No. 5,530,243 issued to Mathis. The formation density may also be determined using the method described in U.S. Pat No. 3,321,625 issued to Wahl, or any similar method known in the art. The method of determining the formation density is not meant to limit the invention. The density of the mud can be determined from measurements made at the earth's surface, as is well known in the art. It is also known in the art to operate the instrument (10 in FIG. 1) so that it does not contact the wall of the wellbore 2 whereby the measurements made by the instrument 10 will correspond to the density of the mud.

Having determined the density of the formation and the density of the mud, it is then possible to generate a wellbore profile function P, whose magnitude is indicative of the distance between the exterior surface of the shield (18 in FIG. 1) and the wall of the wellbore 2 proximal to either the null 20 or the first 22 detector. The profile function P can be determined by the expression:

$$P(\rho_F, \rho_M, z) = \frac{1}{w} \int_{-\infty}^{z} \zeta(\rho_F - \rho_m, z') dz' \quad (5)$$

Figure 6:
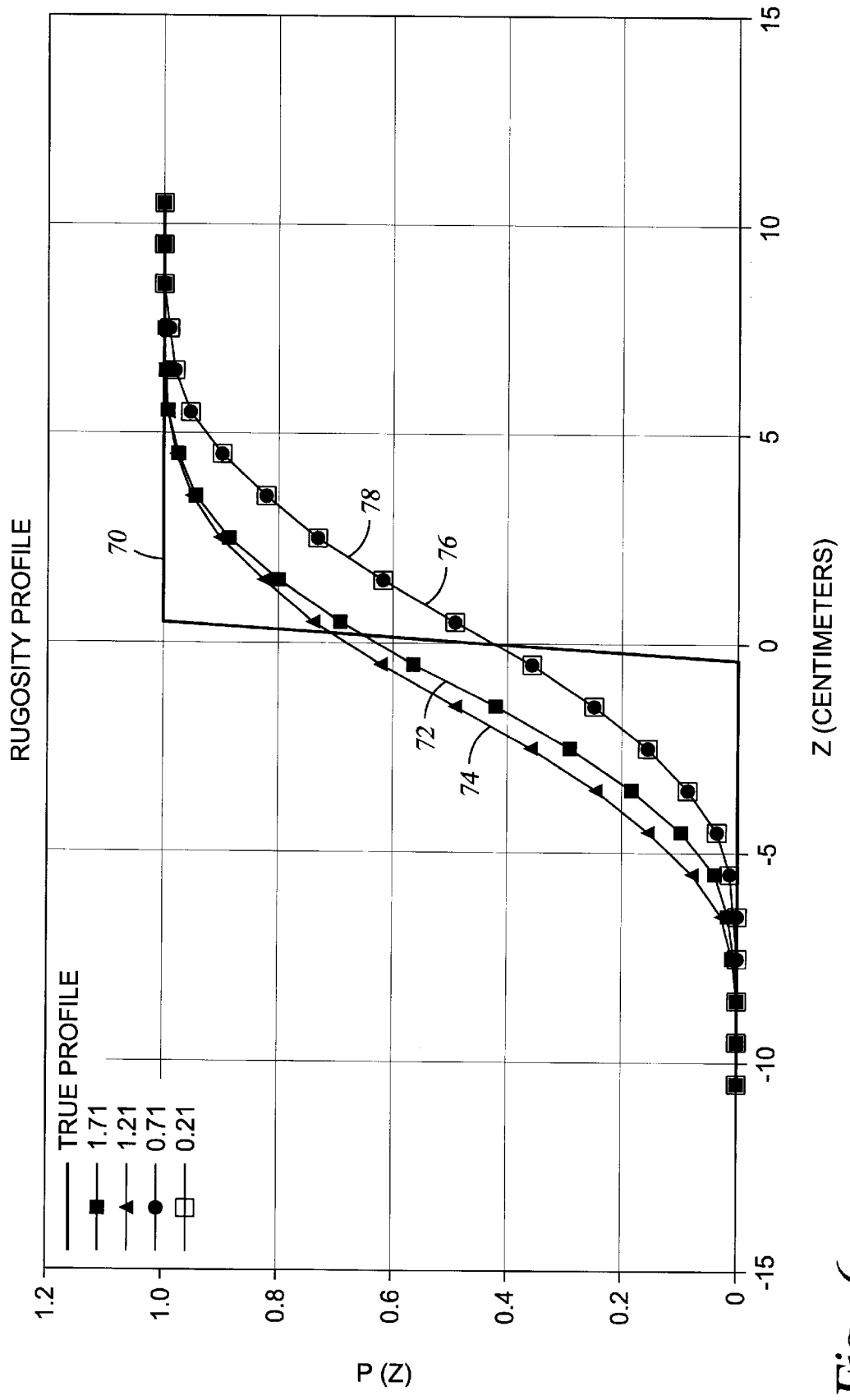
FIG. 6 shows the value of a profile function with respect to the position of the detectors in the vicinity of the discontinuity.
Figure 8:
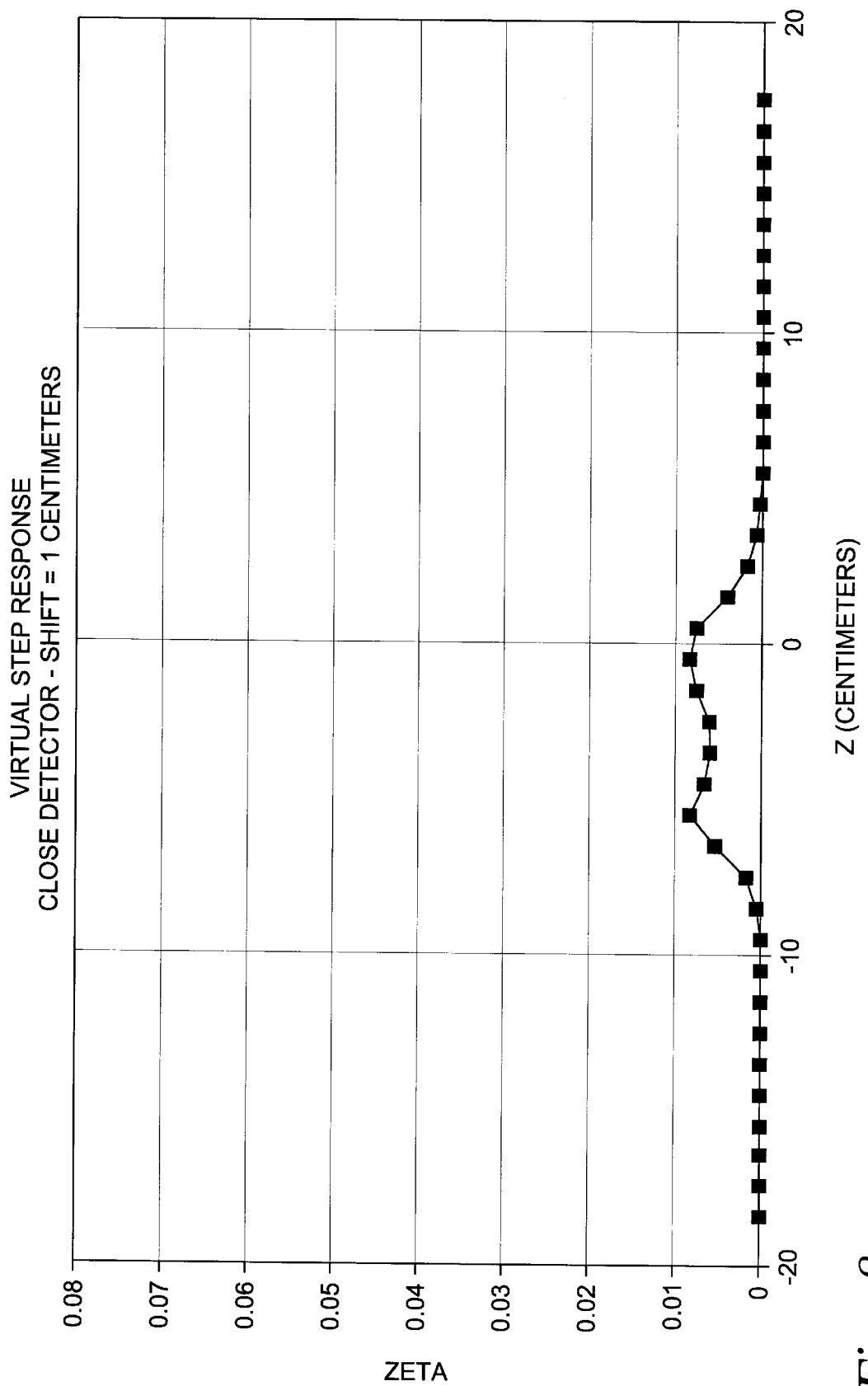
FIGS. 8–19 show the response of the function $\zeta$ to a step like discontinuity in the wellbore wall for various values of a spacing "delay" between successive measurements of the same detector as shown in FIG. 7.
Figure 9:
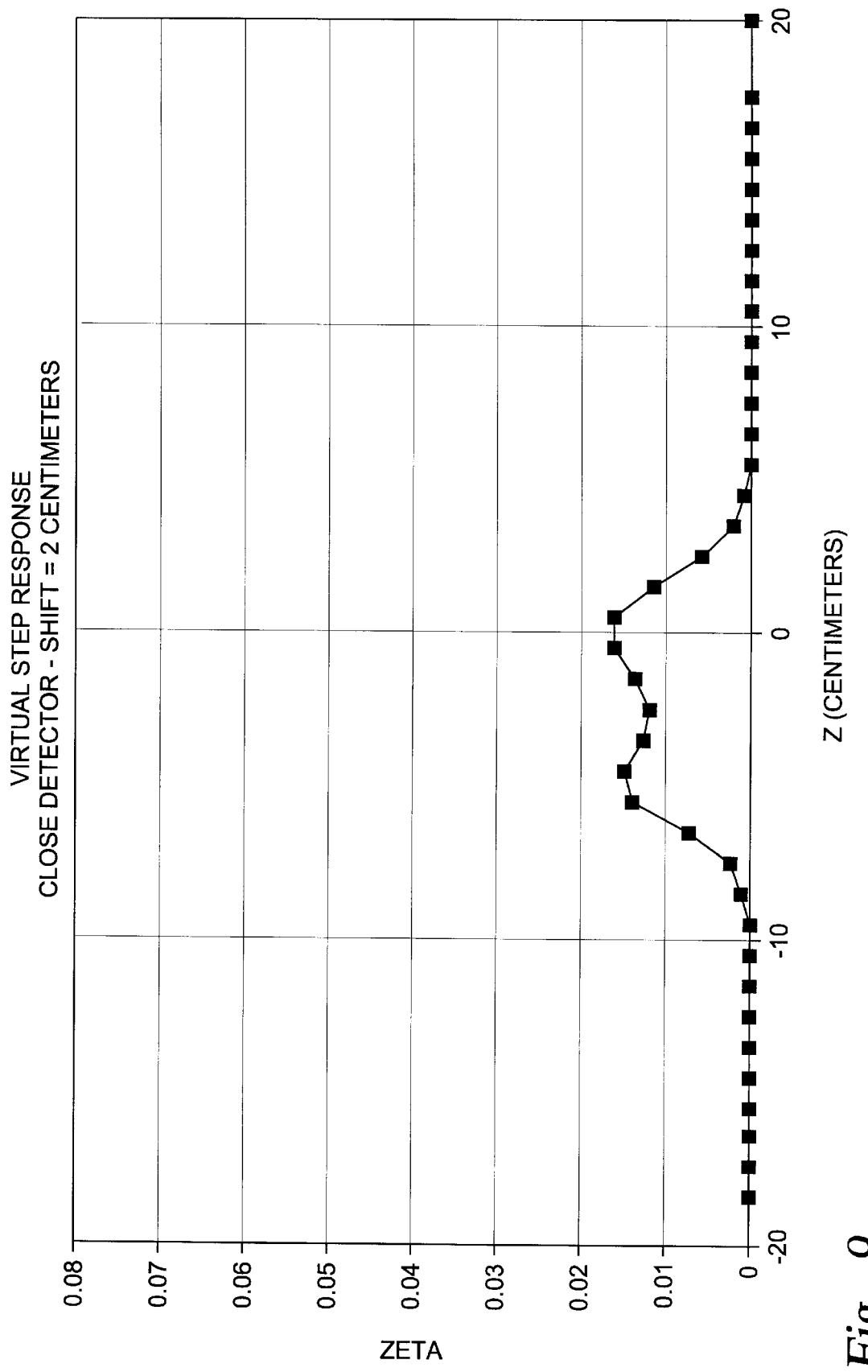
Figure 10:
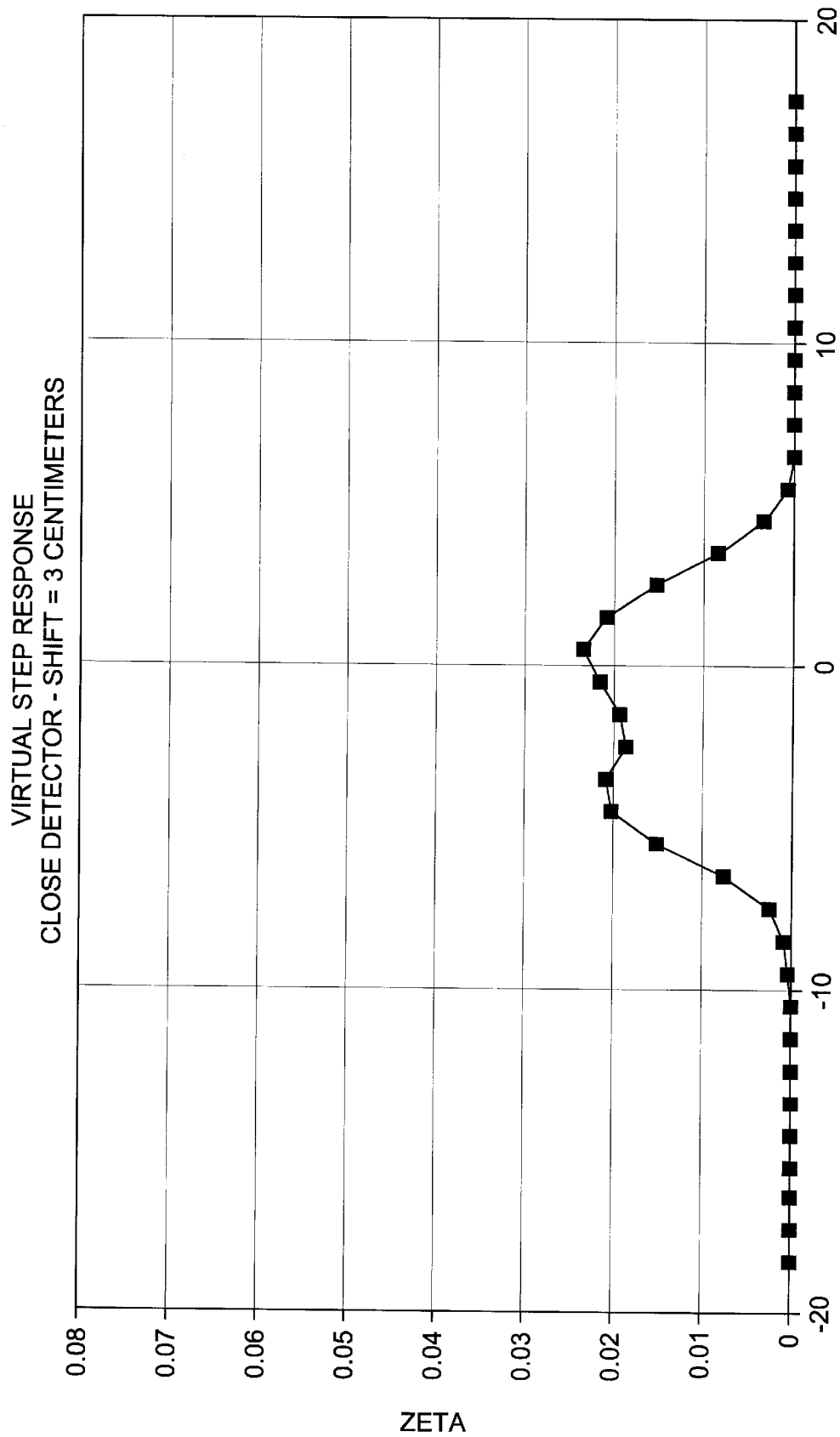
Figure 11:
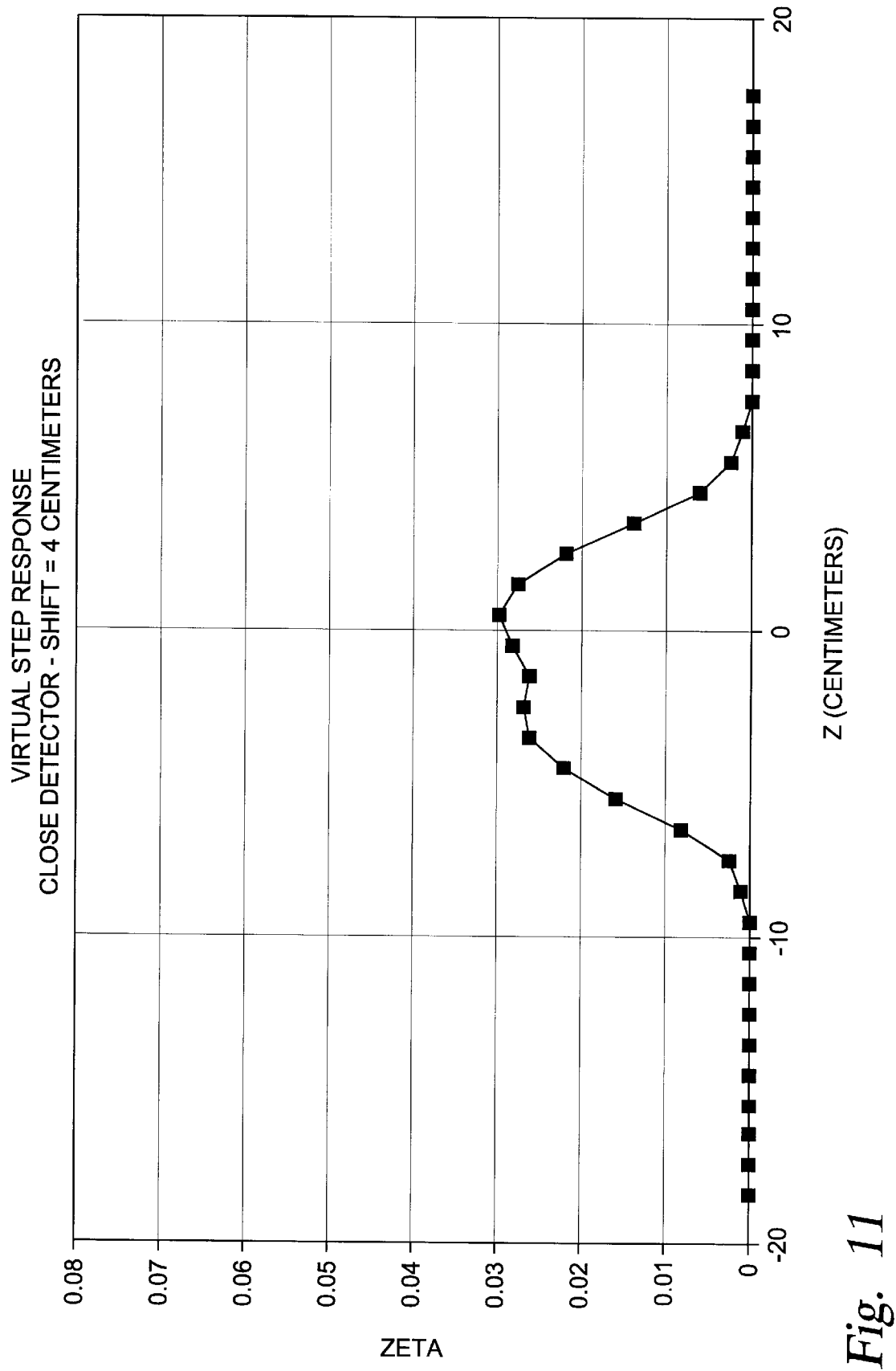
Figure 12:
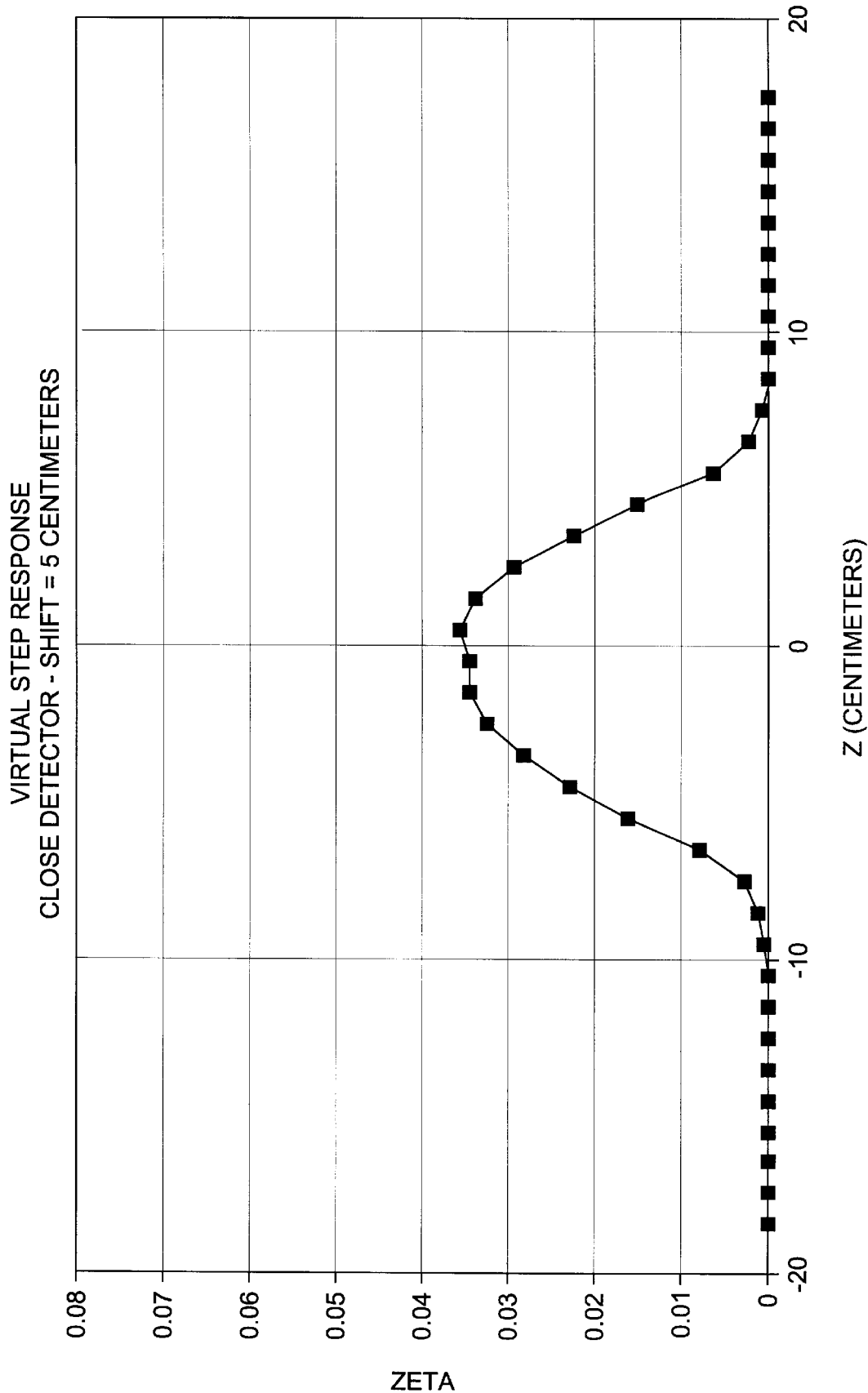
Figure 13:
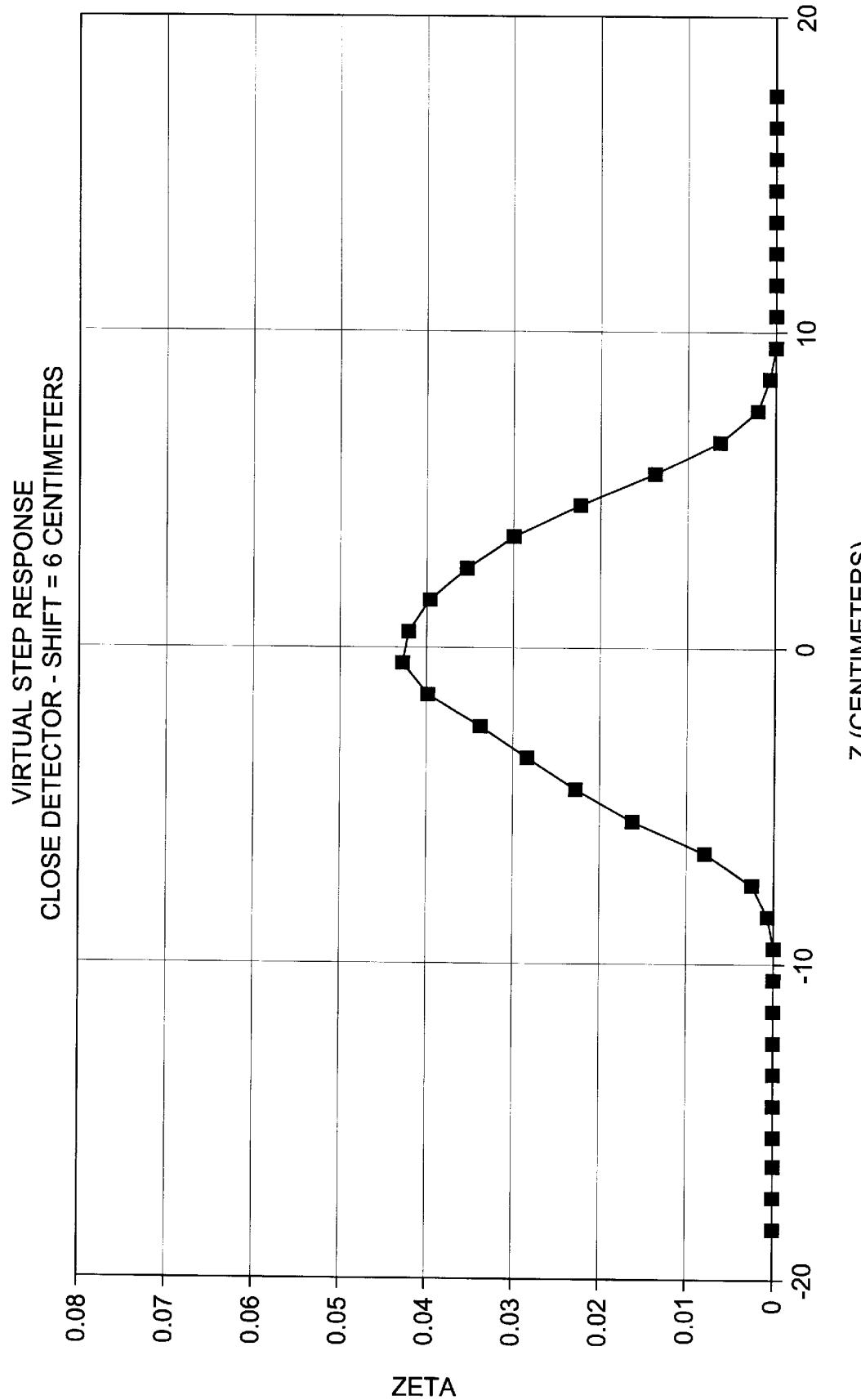
Figure 14:
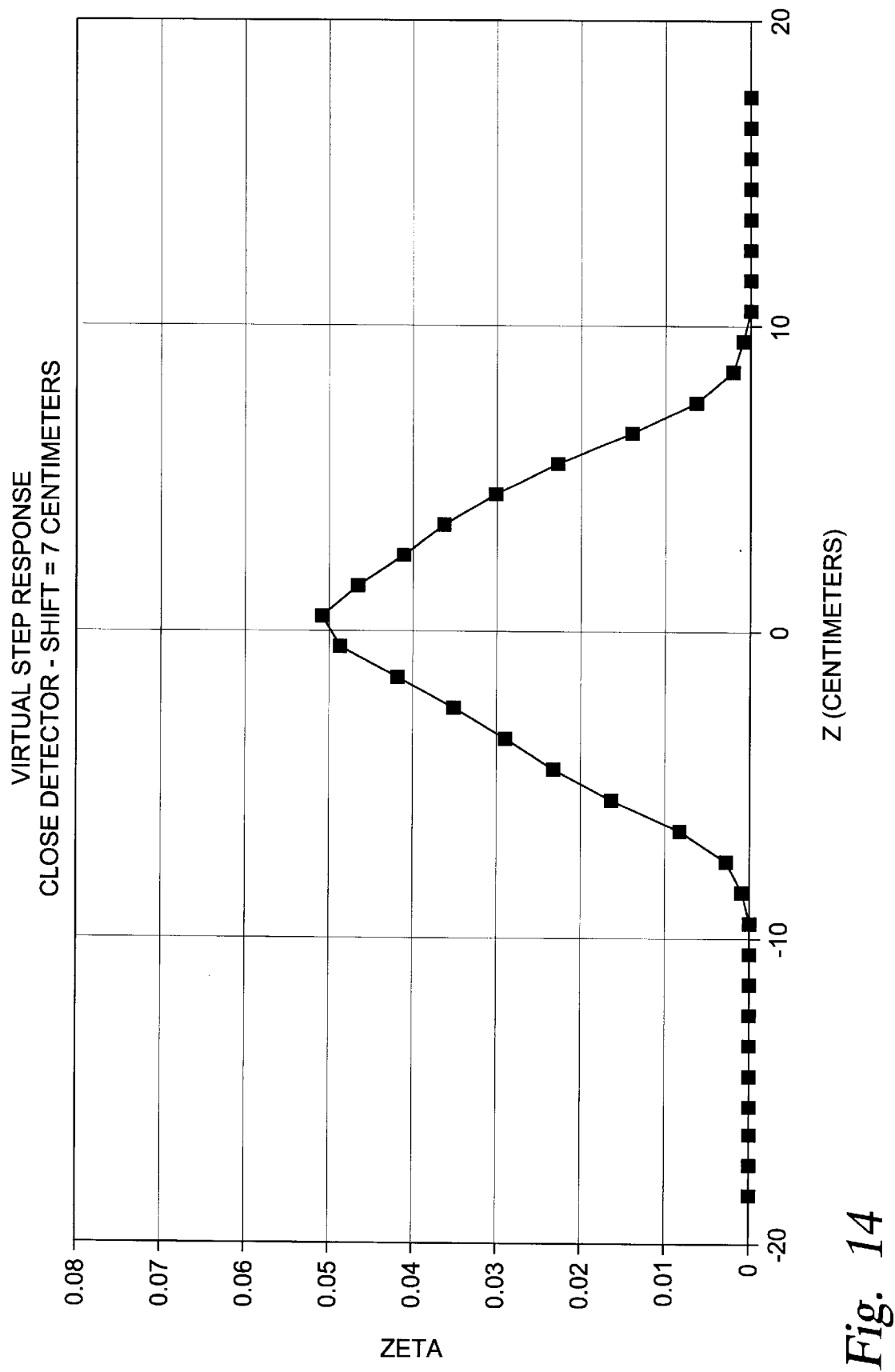
Figure 15:
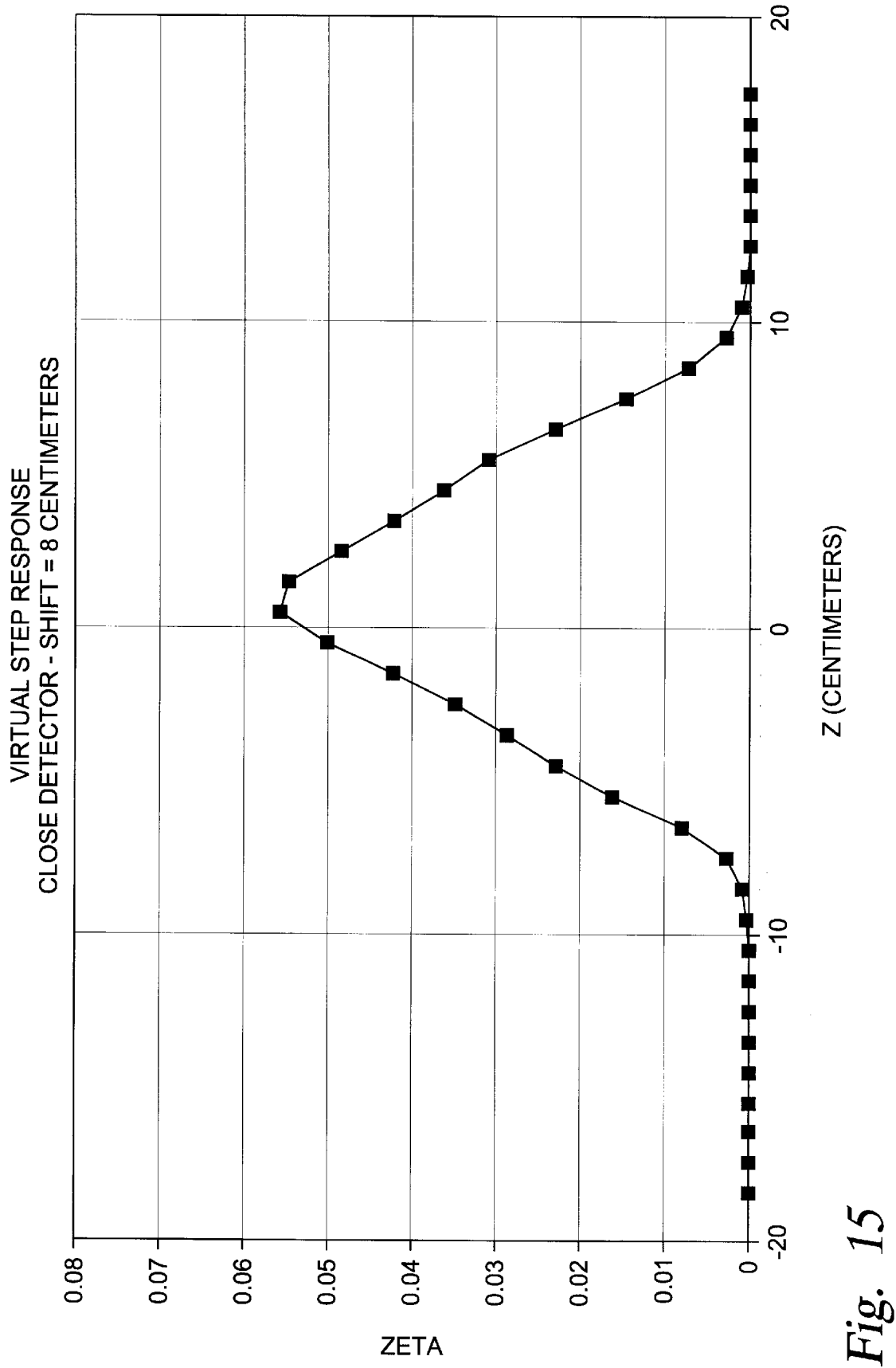
Figure 16:
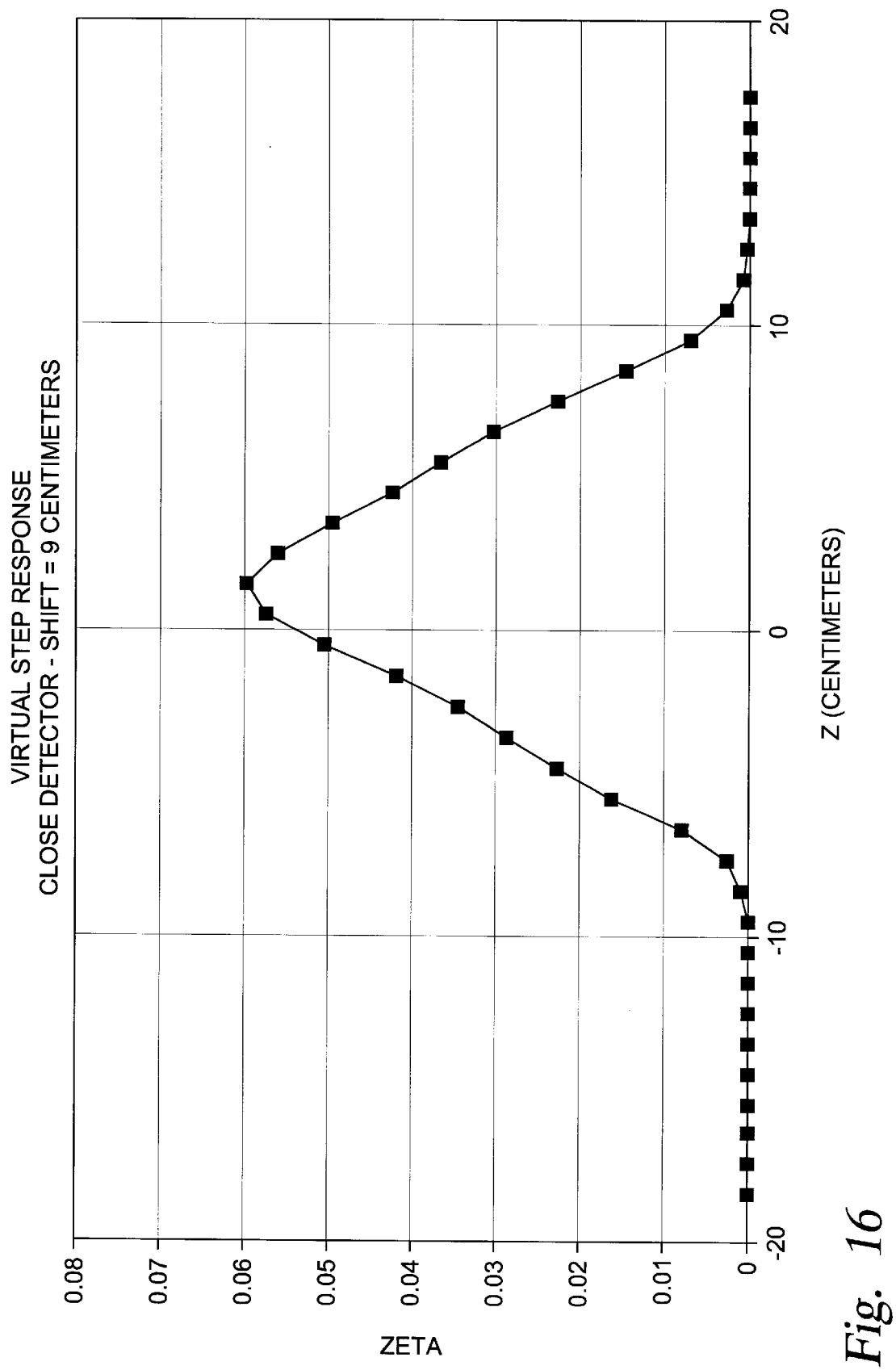
Figure 17:
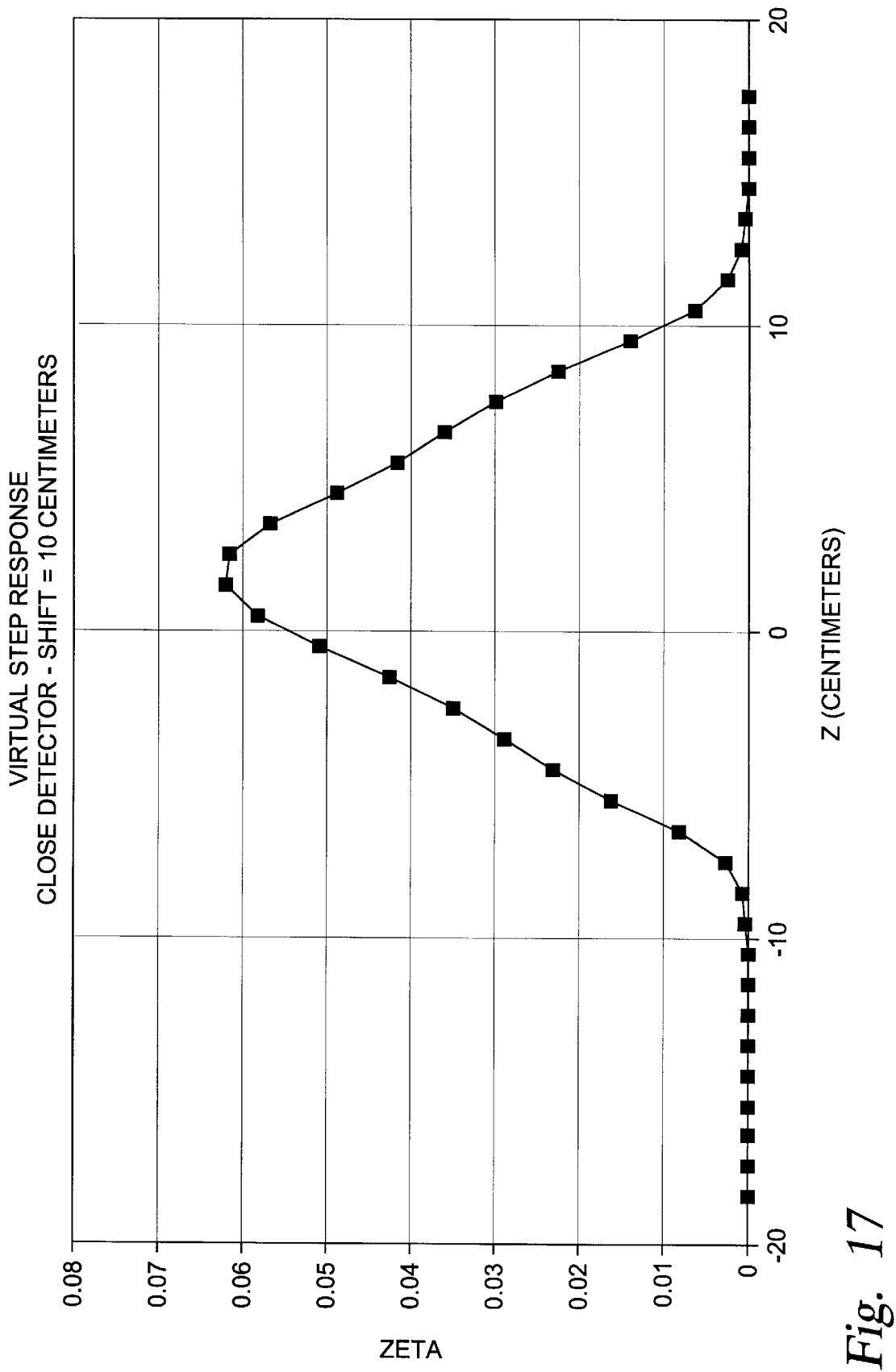
Figure 18:
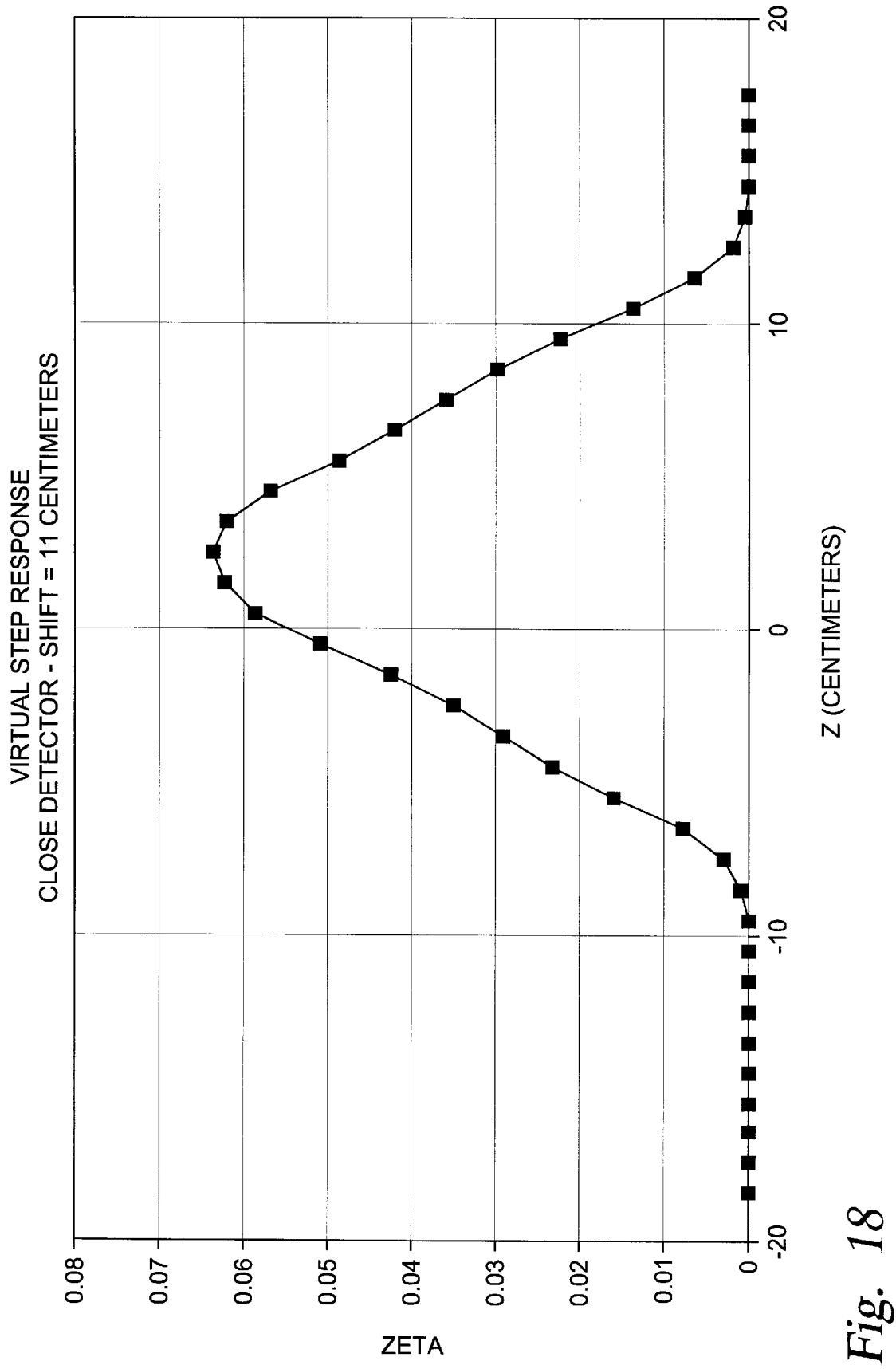
Figure 19:
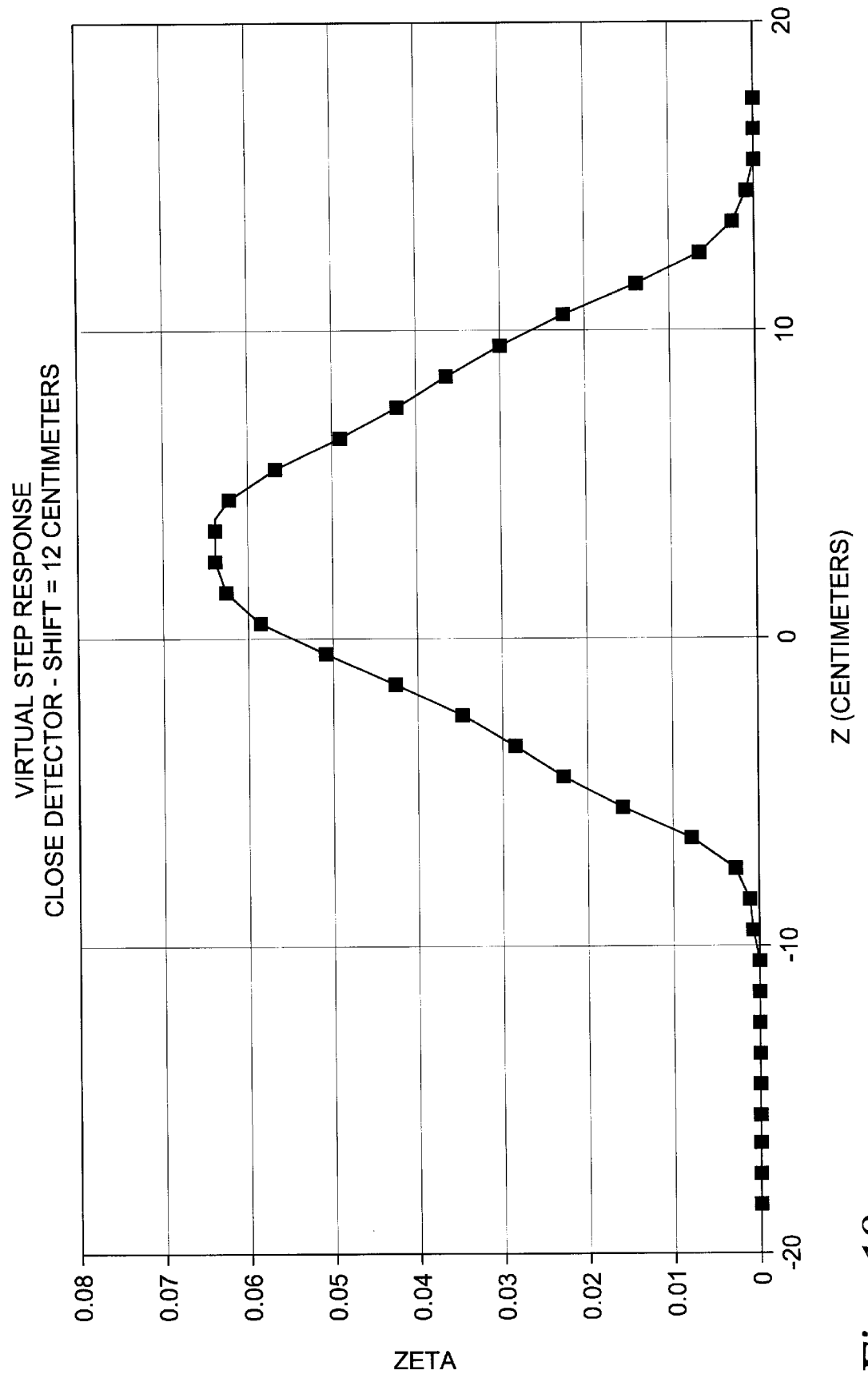

For the example discontinuity shown in FIG. 2B having a radial depth Δx of 1 cm, a graph of the value of the profile function P for various values of the difference in density between the mud and the formation is shown in FIG. 6. The "true" profile of the discontinuity is shown at curve 70. Values of P for density difference of 1.71 gm/cc are shown in curve 74. Values of P for density difference of 1.21 gm/cc are shown in curve 76. Values of P for density difference of 0.71 and 0.21 gm/cc are shown in curve 78, these two sets of values being substantially indistinguishable.

DESCRIPTION OF ALTERNATIVE EMBODIMENTS

It is also possible to use measurements made by a single detector, which are delayed, in combination with later measurements made by the same detector to provide the equivalent of a set of measurements from two detectors. Referring now to FIG. 7, the instrument is shown in the lower part of the drawing when the shield 16 is positioned so that the source 18 and the first detector 22 are positioned on the "open" side of the discontinuity 42 so that the source 18 and the first detector 22 are exposed primarily to the drilling mud in the wellbore. It will be noted that the shield 16 in FIG. 7 does not include the null detector (20 in FIG. 1). The null detector may still be present in the shield 18 for other purposes, but it is not shown in FIG. 7 because its measurements need not be used in this embodiment of the invention. The shield 18 in FIG. 7 may also include one or more other detectors, such as shown in the instrument arrangement of U.S. Pat No. 3,321,625 issued to Wahl. It is to be clearly understood, however, that only a single detector, such as the first detector 22, needs to be used to perform this alternative method of the invention.

Detections of gamma rays made by the first detector 22 can be recorded, either in the telemetry unit (30 in FIG. 1) or in other well known equipment located at the earth's surface. The recorded detection measurements will be combined with measurements made after the instrument (10 in FIG. 1) has moved a predetermined distance, so that the function ζ, described in the first embodiment of the invention, can be determined as a relationship between the recorded measurements and the later made measurements.

In the upper part of FIG. 7, the shield is shown at 16', the source is shown at 18' and the first detector is shown at 22' being positioned on the opposite ("closed") side of the discontinuity 42 and in close contact with the wall of the wellbore, after having moved a predetermined distance along the wellbore. The amount by which the instrument 10 has been moved is shown as Δz. As is known in the art, the amount of movement of the instrument is typically determined indirectly by measuring the amount of motion of the armored electrical cable (12 in FIG. 1). The detector 22 measurements made when the instrument is in the lower position in FIG. 7 can be combined with the detector 22' measurements made when the cable 12 has moved an amount Δz corresponding to the instrument being located in the upper position in FIG. 7. The combination of detector measurements can be performed in substantially the same manner as in the first embodiment of the invention to determine the value of the function ζ, and subsequently, the wellbore profile function P. An important aspect of using the combination of the "current" detector measurements (from detector 22' in FIG. 7) with delayed detector measurements (from detector 22 in FIG. 7) from the single physical detector, to perform the alternative method of the invention, is determining an appropriate value of Δz. In this embodiment of the invention, an optimal value for Δz can be determined by laboratory experiment, or by gamma ray diffusion modeling as will be explained in the appendix to this description of the invention.

As an example of determining an optimum value of Δz for a particular arrangement of source and detector, consider an experimental condition using a 1.5 curie cesium-137 gamma ray source 18 as is typically used with density well logging instruments. A single gamma ray detector 22 can be spaced at 6.5 cm from the source. Both the source and detector can be positioned in a shield as shown in FIG. 7. The detector 22 can be positioned so that it is "ahead" of the source in the direction of motion of the instrument. The function ζ can be defined in terms of the ratio of the count rates of the detector R as currently measured, with respect to the count rate of the detector "delayed" R' by a distance equal to Δz:

$$\zeta = \ln\left(\frac{R}{R'}\right) \quad (6)$$

By calculating the resulting value for the function ζ with respect to the axial position of the instrument, for different values of Δz, it is then possible to select an optimal value for Δz. Referring to FIGS. 8 through 19, graphs are shown, for values of Δz including 1 through 12 cm, respectively, of the value of the function ζ with respect to the axial position of the instrument adjacent to a 1 cm step-like discontinuity (such as 42 in FIG. 7. As can be inferred from the graphs in FIGS. 8 through 19, the function ζ has the "sharpest" peak, meaning the highest overall amplitude and the smallest peak width at half the maximum amplitude, when the value of Δz is about 9 cm. This can be interpreted as indicating that a value of Δz of about 9 cm will provide the optimum response to the profile of the wall of the wellbore for the single detector configuration as described herein. Other values of axial spacing between the source and detector are possible. Using the estimating procedure described herein, an optimal value for $\Delta z$ can be determined for any such arrangement of source and detector.

APPENDIX—FINITE DIFFERENCE SOLUTION TO SINGLE ENERGY GROUP DIFFUSION EQUATION

Gamma ray flux diffusing at a single energy level can be represented by the equation:

$$\nabla^2 \phi - \frac{\phi}{L^2} + \frac{S}{D} = 0 \tag{7}$$

where $\phi$ represents the flux, L represents the diffusion length, D represents a diffusion constant, and S represents the intensity of the source of gamma rays. Rearranging this expression in terms of $\phi$ provides the expression:

$$\phi = \frac{L^2}{D} S + L^2 \nabla^2 \phi \tag{8}$$

In two-dimensions using rectangular coordinates, the Laplacian of the expression for the flux can be represented by the following expression:

$$\nabla^2 \phi = \frac{\partial^2 \phi}{\partial x^2} + \frac{\partial^2 \phi}{\partial y^2} \tag{9}$$

By dividing the 2-dimensional space into four discrete points, $\phi_1 - \phi_4$, each having a spacing h from the origin, and providing that h is small, it can be shown that:

$$\nabla^2 \phi = \frac{1}{h^2} (\phi_1 + \phi_2 + \phi_3 + \phi_4 - 4\phi_0) \tag{10}$$

The expression in equation (10) is explained in W. H. Hayt, Jr., "Engineering Electromagnetics", McGraw-Hill, New York, 1968 (p. 168). It is then possible to approximately determine the flux at the origin $\phi_0$ by the expression:

$$\phi_0 = \frac{\frac{L^2}{D} S_0 + \frac{4L^2}{h^2} + \frac{1}{h^2} \frac{(\phi_1 + \phi_2 + \phi_3 + \phi_4)}{4}}{1 + 4\frac{L^2}{h^2}} \tag{11}$$

by defining an average flux for the four points adjacent to the origin as:

$$\bar{\phi}_0 = \frac{(\phi_1 + \phi_2 + \phi_3 + \phi_4)}{4} \tag{12}$$

then the equation defining the flux at the origin $\phi_0$ becomes:

$$\phi_0 = \frac{h^2 L^2 S_0}{D(h^2 + 4L^2)} + \frac{4L^2 \bar{\phi}}{h^2 + 4L^2} \tag{13}$$

L, the diffusion length and D the diffusion constant are defined in terms of the density of the medium $\rho$ through which the gamma rays diffuse, and the mass attenuation coefficient k for gamma rays from a cesium-137 source as is typically used in the instrument of FIG. 1, equal to about 0.0771 cm²/gm. These definitions are:

$$L = \frac{1}{k\rho}, D = \frac{1}{4\pi k\rho} \tag{14}$$

Using these definitions, the flux can be determined by the expression:

$$\phi_0 = \frac{0.969 h^2 \rho}{0.0594(h^2 \rho^2) + 4} S_0 + \frac{4}{0.0594(h^2 \rho^2) + 4} \bar{\phi} \tag{15}$$

The expression in equation (15) can be used to calculate gamma ray flux using a spreadsheet, or similar program. The spreadsheet set up can include a geometry representing the instrument, the source, the detectors and the formations in contact with the shield.

Those skilled in the art will devise other embodiments of this invention which do not depart from the spirit of the invention as disclosed herein. Accordingly, the invention should be limited in scope only by the attached claims.

What is claimed is:

1. A method for determining a profile of a wall of a wellbore drilled through earth formations, comprising:
   irradiating said earth formations with a source of gamma rays;
   detecting scattered gamma rays at axially spaced apart locations from said source, at least one of said axially spaced apart locations positioned on an opposite side of said source from other ones of said spaced apart locations;
   calculating a function related to a rate of detecting said scattered gamma rays at a first one of said spaced apart locations with respect to a rate of detecting said scattered gamma rays at said at least one spaced apart location positioned on said opposite side of said source;
   determining density of said earth formations and density of fluid in said wellbore and a difference between said densities;
   determining an area bounded by said function;
   scaling said area with respect to said difference between said densities; and
   calculating said profile from said scaled area bounded by said function.

2. The method as defined in claim 1 wherein a relationship between said area bounded by said function and said difference in density is determined by simulating detector responses which would obtain at said first one and said at least one spaced apart locations when a radial depth of a discontinuity in said profile is set to a single predetermined value and said difference in density is set to a plurality of predetermined values.

3. The method as defined in claim 1 wherein said first one and said at least one of said spaced apart locations are each located about 5 inches from said source.

4. The method as defined in claim 1 wherein said density of said earth formation is determined from counting rates of said scattered gamma rays detected at said spaced apart locations.

5. A method for determining a profile of a wall of a wellbore drilled through earth formations from measurements of scattered gamma rays detected at spaced apart locations from a source of said gamma rays, at least one of said axially spaced apart locations positioned on an opposite side of said source from other ones of said spaced apart locations, the method comprising:
   calculating a function related to a rate of detecting said scattered gamma rays at a first one of said spaced apart locations with respect to a rate of detecting said scattered gamma rays at said at least one spaced apart location positioned on said opposite side of said source;
   determining density of said earth formations and density of fluid in said wellbore and a difference between said densities;

determining an area bounded by said function;

scaling said area with respect to said difference between said densities; and calculating said profile from said scaled area bounded by said function.

6. The method as defined in claim 5 wherein a relationship between said area bounded by said function and said difference in density is determined by simulating detector responses which would obtain at said first one and said at least one spaced apart locations when a radial depth of a discontinuity in said profile is set to a single predetermined value and said difference in density is set to a plurality of predetermined values.

7. The method as defined in claim 5 wherein said first one and said at least one of said spaced apart locations are each located about 5 inches from said source.

8. The method as defined in claim 5 wherein said density of said earth formation is determined from counting rates of said scattered gamma rays detected at said spaced apart locations.

9. A method for determining a profile of a wall of a wellbore drilled through earth formations, comprising:

irradiating said earth formations with a source of gamma rays;

initially detecting scattered gamma rays at a predetermined axial spacing from said source;

recording measurements of said detecting;

subsequently detecting said scattered gamma rays, at said predetermined axial spacing, after said source has moved a predetermined distance;

calculating a function related to a rate of detecting said scattered gamma rays during said step of initially detecting with respect to said step of subsequently detecting;

determining density of said earth formations and density of fluid in said wellbore and a difference between said densities;

determining an area bounded by said function;

scaling said area with respect to said difference between said densities; and calculating said profile from said scaled area bounded by said function.

10. The method as defined in claim 9 wherein a relationship between said area bounded by said function and said difference in density is determined by simulating detector responses which would obtain during said steps of initially detecting and subsequently detecting, when a radial depth of a discontinuity in said profile is set to a single predetermined value and said difference in density is set to a plurality of predetermined values.

11. A method for determining a profile of a wall of a wellbore drilled through earth formations from measurements of scattered gamma rays initially detected at a spaced apart location from a source of said gamma rays, and measurements of scattered gamma rays subsequently detected at said spaced apart location from said source when said source has moved a predetermined distance, the method comprising:

calculating a function related to a rate of said initially detecting said scattered gamma rays with respect to a rate of said subsequently detecting said scattered gamma rays;

determining density of said earth formations and density of fluid in said wellbore and a difference between said densities;

determining an area bounded by said function;

scaling said area with respect to said difference between said densities; and calculating said profile from said scaled area bounded by said function.

12. The method as defined in claim 11 wherein a relationship between said area bounded by said function and said difference in density is determined by simulating detector responses which would obtain during said initially detecting and said subsequently detecting, when a radial depth of a discontinuity in said profile is set to a single predetermined value and said difference in density is set to a plurality of predetermined values.

* * * * *